United States Patent
Halavach

(10) Patent No.: US 10,723,372 B2
(45) Date of Patent: Jul. 28, 2020

(54) FRICTION SHOCK ABSORBER

(71) Applicant: Aleh Nicolaevich Halavach, Bobruisk (BY)

(72) Inventor: Aleh Nicolaevich Halavach, Bobruisk (BY)

( * ) Notice: Subject to any disclaimer, the term of this patent is extended or adjusted under 35 U.S.C. 154(b) by 3 days.

(21) Appl. No.: 16/310,421

(22) PCT Filed: Feb. 8, 2017

(86) PCT No.: PCT/BY2017/000006
§ 371 (c)(1),
(2) Date: Dec. 14, 2018

(87) PCT Pub. No.: WO2018/023187
PCT Pub. Date: Feb. 8, 2018

(65) Prior Publication Data
US 2019/0144016 A1     May 16, 2019

(30) Foreign Application Priority Data
Aug. 4, 2016 (EA) .............................. 2016/EA/0056

(51) Int. Cl.
*B61G 11/14* (2006.01)
*F16F 7/08* (2006.01)
(Continued)

(52) U.S. Cl.
CPC .............. *B61G 11/14* (2013.01); *B61G 11/18* (2013.01); *F16F 7/08* (2013.01); *F16F 7/095* (2013.01);
(Continued)

(58) Field of Classification Search
CPC . B61G 11/14; B61G 11/18; B61G 9/00; F16F 7/08; F16F 7/095; F16F 13/00;
(Continued)

(56) References Cited

U.S. PATENT DOCUMENTS

| 1,632,915 A | 6/1927 | O'Connor |
| 3,178,036 A * | 4/1965 | Cardwell ................. B61G 9/10 |
| | | 213/33 |

(Continued)

FOREIGN PATENT DOCUMENTS

| RU | 2198809 | 2/2003 |
| RU | 2338100 | 11/2008 |

(Continued)

OTHER PUBLICATIONS

Written Opinion for PCT/BY2017/000003 dated Jul. 13, 2017, 3 pps.

(Continued)

*Primary Examiner* — Melanie Torres Williams
(74) *Attorney, Agent, or Firm* — Michael D. Downs; Fincham Downs LLC

(57) ABSTRACT

The present invention relates to the field of transport mechanical engineering.
Object—improve performance and operational reliability of a friction shock absorber.
The friction shock absorber (FIG. 2) comprises housing (1), whose walls form orifice (2), and bottom (4) that is in contact with return-and-retaining device (5) contacting a friction assembly that consists of the following elements fitted out with friction surfaces (f1-f10): supporting plate (10), pressure wedge (6), stay wedges (7), and reverse-U-shaped movable plates (9) fitted out with side shelves (14) that cover guide plates (8) and are located on supporting plate (10). Return-and-retaining device (5) is available between the guide plates. Additional return-and-retaining device (11) is available between the pressure wedge and the supporting plate.
Recesses for the return-and-retaining device and hard lubricant inserts are available on the guide plates;

(Continued)

Figure 1:
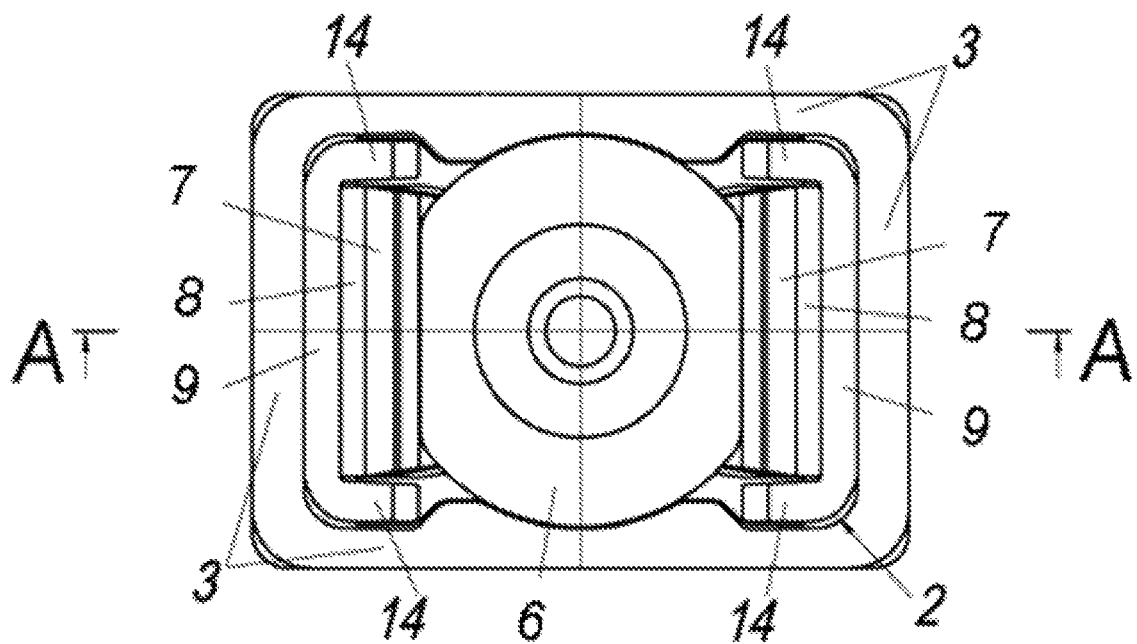

Section A-A per Fig.1

Movable plates may be partially T-shaped forming side shelves that are located on the supporting plate.

Hooks (15, 16) are available on the pressure wedge and stay wedges, located so as to enable a mutual contact during the back stroke of the pressure wedge.

6 Claims, 5 Drawing Sheets

(51) Int. Cl.
*F16F 13/00* (2006.01)
*B61G 11/18* (2006.01)
*F16F 7/09* (2006.01)
*F16F 13/04* (2006.01)

(52) U.S. Cl.
CPC ............ *F16F 13/00* (2013.01); *F16F 13/005* (2013.01); *F16F 13/04* (2013.01); *F16F 2222/04* (2013.01); *F16F 2230/04* (2013.01); *F16F 2234/00* (2013.01); *F16F 2236/045* (2013.01)

(58) Field of Classification Search
CPC ...... F16F 13/005; F16F 13/04; F16F 2222/04; F16F 2230/04; F16F 2234/00; F16F 2236/045
USPC .................................................. 213/32 C, 33
See application file for complete search history.

(56) References Cited

U.S. PATENT DOCUMENTS

| | | | |
|---|---|---|---|
| 3,255,892 A | 6/1966 | Mulcahy | |
| 4,076,129 A | 2/1978 | Housman | |
| 4,645,187 A * | 2/1987 | Kanjo | B61G 3/04 |
| | | | 213/33 |
| 4,735,328 A * | 4/1988 | Carlstedt | B61G 9/10 |
| | | | 213/33 |
| 4,960,215 A | 10/1990 | Carlstedt | |
| 5,152,409 A * | 10/1992 | Sommerfeld | B61G 9/10 |
| | | | 213/32 C |
| 7,419,065 B2 | 9/2008 | Sommerfeld et al. | |
| 8,672,151 B2 * | 3/2014 | Sprainis | B61G 9/20 |
| | | | 213/32 C |
| 2018/0355947 A1 | 12/2018 | Halavach | |
| 2019/0301559 A1 | 10/2019 | Halavach | |

FOREIGN PATENT DOCUMENTS

| | | |
|---|---|---|
| RU | 2380257 | 1/2010 |
| RU | 157497 | 12/2015 |
| WO | WO/2017/143422 | 8/2017 |
| WO | WO/2018/064741 | 4/2018 |

OTHER PUBLICATIONS

International Search Report for PCT/BY2017/000003 dated Jul. 13, 2017, 1 pps.
Written Opinion for PCT/BY2017/000002 dated Aug. 14, 2017, 4 pps.
International Search Report for PCT/BY2017/000002 dated Aug. 14, 2017, 1 pps.
Office Action for U.S. Appl. No. 15/779,728 dated Jan. 13, 2020; 8 pps.

\* cited by examiner

Section A-A per Fig. 1

Figure 5:
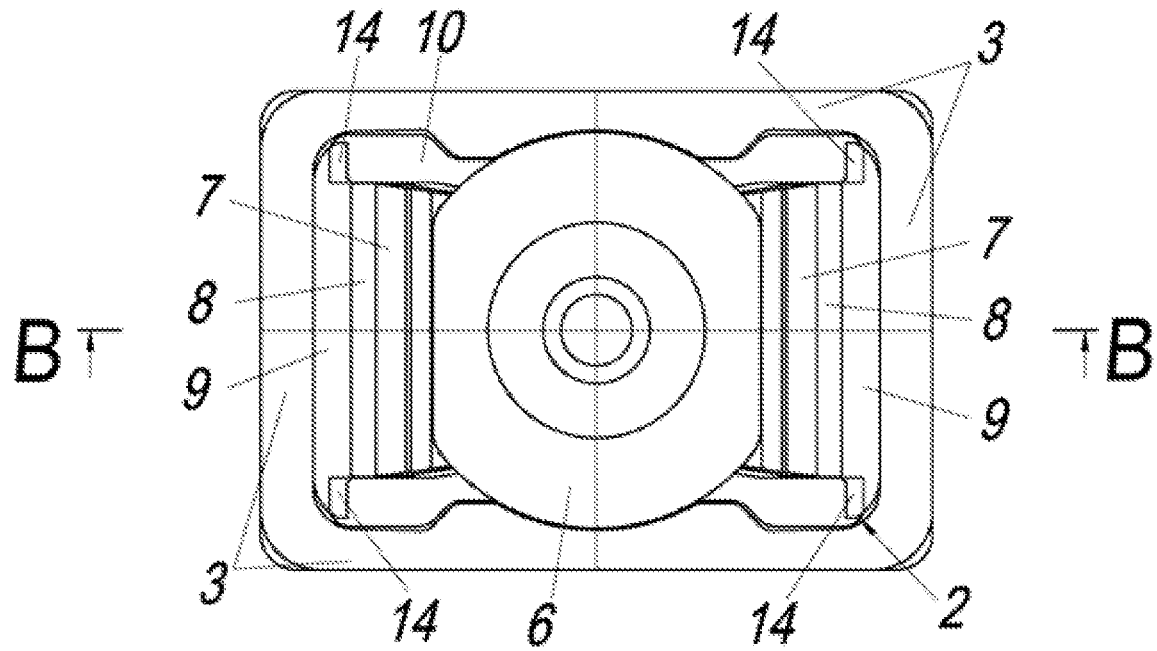

Section B-B per Fig 5.

FRICTION SHOCK ABSORBER

The invention relates to the field of transport mechanical engineering and concerns friction shock absorbers for vehicles, primarily shock-absorbing devices, installed between cars of a railway train.

A friction shock absorber is known in the art [1, Patent U.S. Pat. No. 7,540,387, IPC F16F7/08, B61G9/00 priority date Oct. 8, 2011, publication date Oct. 10, 2014], comprises a friction assembly within its housing that consists of a pressure wedge, stay wedges, movable plates, and guide plates. The friction assembly rests against the return-and-retaining device represented by metal springs installed on the housing bottom.

Such friction assembly lacks power capacity and performance, which is conditioned by the low force wherewith the stay wedges are pressed to the movable plates and guide plates. The lack of performance is due to the fact that the return-and-retaining device occupies a space under the friction assembly only, wherein heavy springs cannot be positioned.

The said problem is solved by the prior art friction shock absorber [2, Patent RU RU2338100, IPC F16F7/08, B61F5/12, B61G11/14, priority date Apr. 18, 2006, published on Oct. 11, 2008].

It comprises a housing, on the bottom whereof there is a return-and-retaining device represented by a box of resilient-elastic elements contacting the friction assembly that consists of a pressure wedge, stay wedges, guide plates, and movable plates. The streamlined design of the friction assembly allows to install a higher and stiffer return-and-retaining device. This enables to improve the friction shock absorber's power capacity and performance.

However, such improvement in the stiffness of the return-and-retaining device affects the device's reliability. At the end of the maximum compression stroke, the separating and friction-induced forces experience an increase causing the surfaces of friction assembly parts to clamp together or stick up. In most cases, clamping occurs between the friction surfaces of the pressure wedge and those of stay wedges, or between those of stay wedges and of guide plates, or between all the above parts simultaneously. As a result, upon relief the clamped surfaces either disengage with big delay or cannot disengage at all, for the force exerted by the return-and-retaining device proves to be insufficient to overcome the mutual clamping forces holding the engaged friction assembly parts. It means that the friction shock absorber appears to be either jammed for some time, which affects its operability, or fully stalled and completely inoperable.

The foregoing disadvantages of the prior art friction shock absorber [2] affect its operational reliability and efficiency.

Therefore, the object of the invention is to improve performance and operational reliability of the friction shock absorber by achieving a technical goal that involves prevention of jamming aimed at better performance and improved power capacity of such an impact energy absorbing apparatus.

The above problem is solved by providing a friction shock absorber that comprises a housing, whose walls form an orifice, and a bottom that is in contact with the return-and-retaining device contacting a friction assembly that consists of the following elements with friction surfaces: supporting plate, pressure wedge, stay wedges, and movable plates fitted out with side shelves resting against the support plate, and guide plates with a return-and-retaining device between them. The friction shock absorber has a distinctive feature: an additional return-and-retaining device available between the pressure wedge and the supporting plate of the friction assembly.

This distinctive feature allows to apply additional force to the pressure wedge during the back stroke of the friction shock absorber. Should the friction surfaces of the pressure wedge and the stay wedges clamp together, the additional return-and-retaining device will disengage them, and the friction shock absorber will return to its original position under the force applied by the return-and-retaining device.

The use of the additional return-and-retaining device in the friction shock absorber between the pressure wedge and the supporting plate helps to improve its reliability, and to use a stiffer return-and-retaining device, which secures higher power capacity, and therefore, better performance of such an impact energy absorbing apparatus.

Additional Distinctive Features of the Invention:
recesses are available on the guide plates for the return-and-retaining device;
hard lubricant inserts are available on the guide plates;
movable plates are partially inverted-U-shaped forming side shelves that cover the guide plates and are located on the supporting plate;
movable plates are partially T-shaped forming side shelves that are located on the supporting plate.
hooks are available on the pressure wedge and stay wedges, located so as to enable a mutual contact during the back stroke of the pressure wedge.

Figure 3:
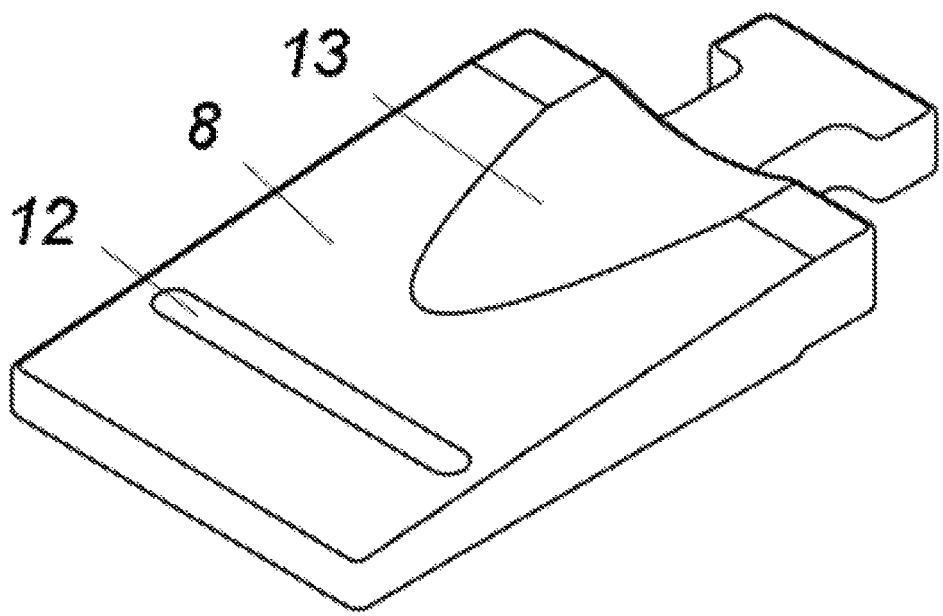
Figure 2:
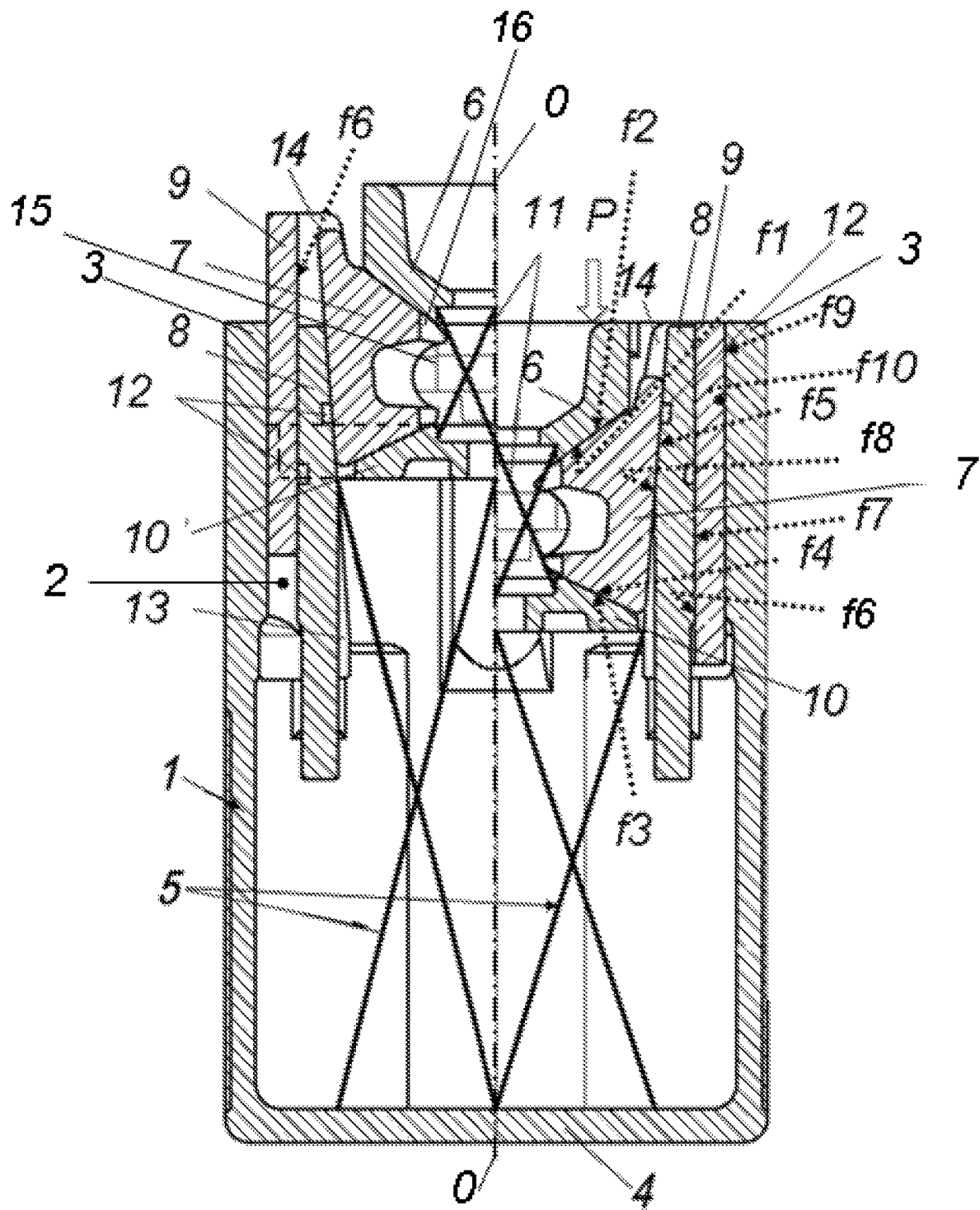
Figure 4:
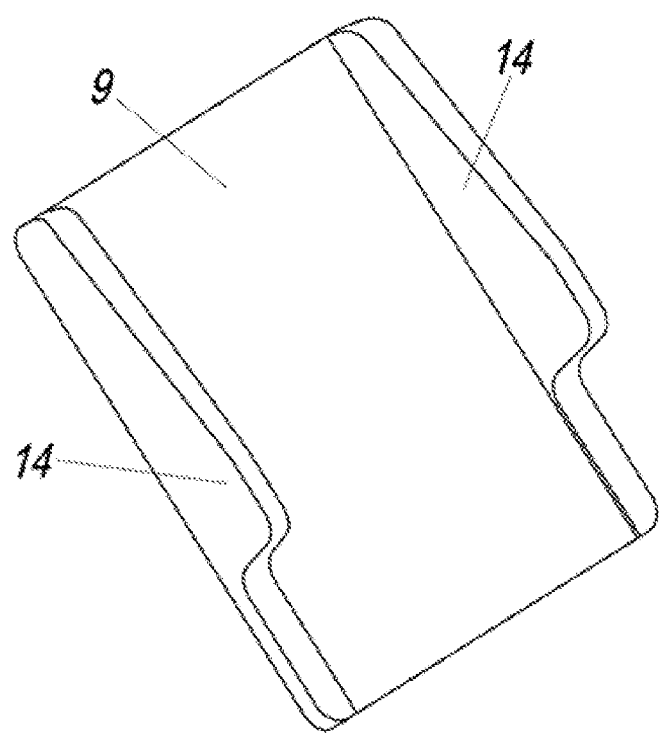
Figure 6:
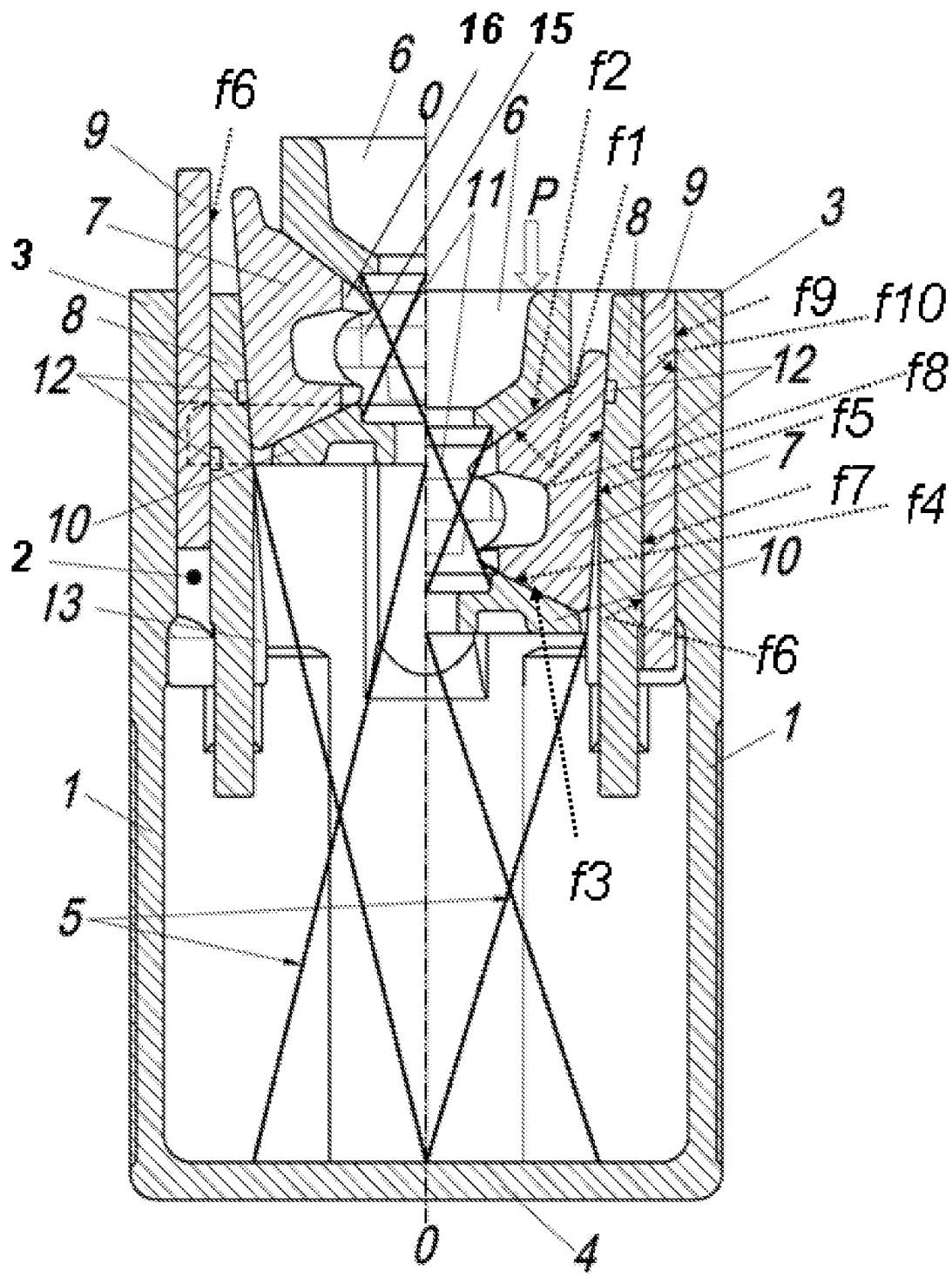
Figure 7:
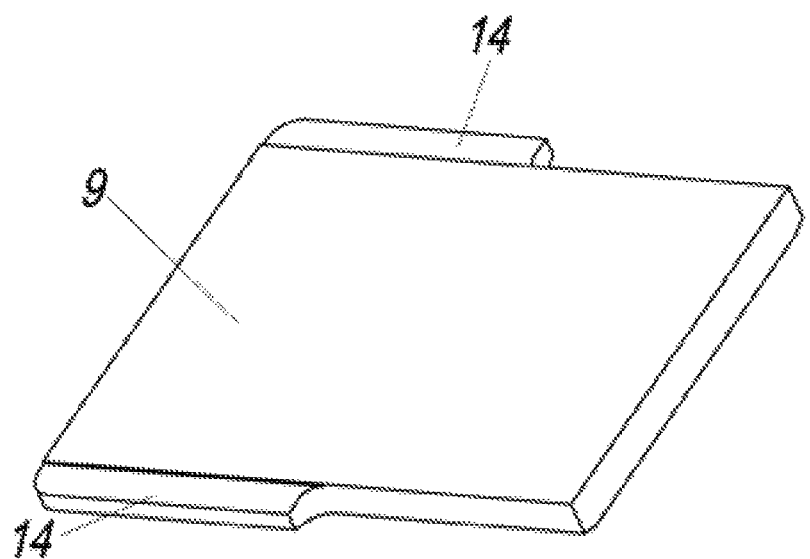
Figure 8:
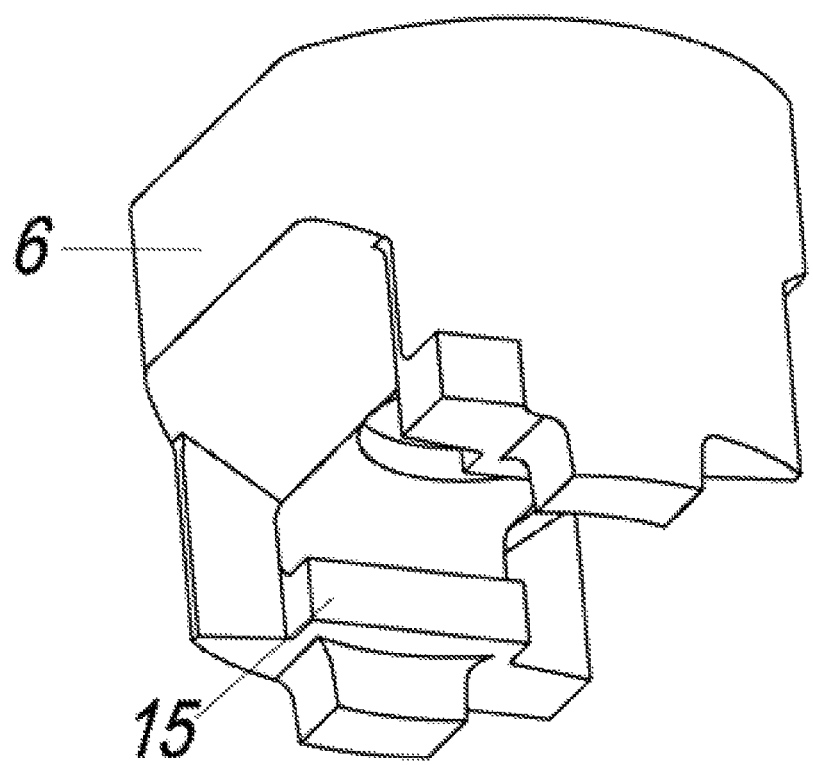

The invention is further described in detail with reference to the accompanying figures, wherein: FIG. 1 shows a top view of the friction shock absorber's utility model wherein movable plates per FIG. 4 are utilized; FIG. 2 shows integrated frontal section A-A per FIG. 1, wherein on the left-hand side the friction shock absorber is shown in its original position, while on the right-hand side it is demonstrated in its compressed state; FIG. 3 shows the guide plate with recesses for the return-and-retaining device; FIG. 4 shows a general view of the friction shock absorber's movable plate per FIGS. 1 and 2; FIG. 5 shows a top view of the friction shock absorber's utility model wherein movable plates per FIG. 7 are utilized; FIG. 6 shows integrated frontal section B-B per FIG. 5, wherein on the left-hand side the friction shock absorber is shown in its original position, while on the right-hand side it is demonstrated in its compressed state; FIG. 7 shows a general view of the friction shock absorber's movable plate per FIGS. 5 and 6; FIG. 8 shows a general view of the friction shock absorber's pressure wedge.

The friction shock absorber (FIGS. 1, 2, and 5, 6) comprises housing 1 that is symmetrical to main axis O-O (FIG. 2, 6) and has orifice 2 formed by its walls 3, and bottom 4, contacting return-and-retaining device 5 (conventionally shown by crossed straight lines), contacting with its other side the friction assembly (FIGS. 1, 2, and 5, 6) that consists of pressure wedge 6, stay wedges 7, guide plates 8, movable plates 9, and supporting plate 10.

Movable plates 9 are located on supporting plate 10 (shown by dashed lines in FIGS. 2 and 6).

These elements 6-10 of the friction assembly have friction surfaces, wherewith they adjoin each other in pairs:
pressure wedge 6 adjoins one of friction surfaces f2 of stay wedges 7 with its surface f1;
the other friction surface f3 of stay wedges 7 adjoins friction surface f4 of supporting plate 10;
the third side friction surface f5 of stay wedges 7 adjoins friction surface f8 of one of guide plates 8;

friction surface f7 of the other side of guide plates 8 adjoins friction surface f6 of one of the surfaces of movable plates 9;

friction surface f9 of the other side of movable plates 9 adjoins friction surface f10 of walls 3 inside orifice 2 of housing 1;

Additional return-and-retaining device 11 (conventionally shown by cross straight lines) is available between pressure wedge 6 and supporting plate 10 of the friction assembly.

Return-and-retaining device 5 and additional return-and-retaining device 11 may be represented (not shown) by one or several compression springs, or by resilient-elastic elements, a hydraulic or other element.

In order to improve the performance of pairs of friction surfaces f5-f8 and f7-f6 when stay wedges 7 and movable plates 9 travel along guide plates 8, it is useful to install hard lubricant inserts 12 on guide plates 8, either on one side, or on both sides of guide plates 8 facing movable plates 9 and stay wedges 7. Such hard lubricant inserts 12 allow to minimize the probability of the aforementioned friction surfaces clamping together or sticking up to each other, and to secure smooth movement of the friction assembly back to its original position.

To ensure that powerful return-and-retaining device 5 is positioned in a space-saving manner, recesses 13 for the return-and-retaining device are available on the guide plates within housing 1.

Movable plates 9 may have a reverse-U-shaped parts (FIGS. 2 and 4), whose side shelves 14 cover (FIG. 1) guide plates 8 and are located on supporting plate 10.

Movable plates 9 (FIG. 7) may also be partially T-shaped forming side shelves 14 that are located on supporting plate 10.

To prevent the friction shock absorber from jamming, it is useful for pressure wedge 6 to have hooks 15 (FIGS. 2, 6, and 8), and for stay wedges 7 to have hooks 16 (FIG. 2, 6) located so as to enable a mutual contact (right-hand side of FIGS. 2 and 6) during the back stroke of pressure wedge 6 to bring stay wedges 7 into their original position.

The operating principle of the friction shock absorber is based on the fact that return-and-retaining device 5 is compressed, when external force P (right-hand sides of FIG. 2, 6) is applied to pressure wedge 6 at the side of the drawbar (not shown) when the cars collide.

In this case the friction assembly is buried into orifice 2 of housing 1. Pressure wedge 6 brings stay wedges 7 inside housing 1.

At a certain phase of the stroke, the pressure plate (not shown) of the automatic coupling device of the car (not shown) begins pressing on movable plates 9 (right-hand sides of FIG. 2, 6). When exposed to this force, they enter into housing 1 along guide plates 8 and walls 3 experiencing friction.

Further on, due to the inclination to main axis O-O of the friction shock absorber, they move towards this axis on guide plates 8, sliding along them, as well as along friction surfaces f1 of pressure wedge 6 and supporting plate 10.

When external force P is released, additional return-and-retaining device 11 pushes pressure wedge 6 away from stay wedges 7, which pressure wedge uses its hooks 15 to catch hooks 16 of stay wedges 7 helping them to return to their original position. As a result, return-and-retaining device 5 can release in a much easier way, pushing supporting plate 10 back into its original position along with the friction assembly installed therein.

This way, due to the force exerted by additional return-and-retaining device 11 on pressure wedge 6, a part of that force is transmitted to stay wedges 7, which allows to use the force exerted by additional return-and-retaining device 11 to not only disengage the surfaces of pressure wedge 10 and stay wedges 7, but to also disengage stay wedges 7 and guide plates 8.

This helps to improve the friction shock absorber's performance and operational reliability by preventing it from jamming.

REFERENCES

1. Patent U.S. Pat. No. 7540387, IPC F16F7/08, B61G9/00, priority date Aug. 10, 2011, publication date Oct. 28, 2014.
2. Patent RU2338100, IPC F16F7/08, B61F5/08, priority date Apr. 18, 2006, publication date Nov. 10, 2008/prior art/.

LIST of reference designations and elements to which they refer

| No. | ELEMENT |
|---|---|
| 1 | housing |
| 2 | orifice |
| 3 | housing 1 wall |
| 4 | housing 1 bottom |
| 5 | return-and-retaining device 5 |
| 6 | pressure wedge |
| 7 | stay wedge |
| 8 | guide plate |
| 9 | movable plate |
| 10 | supporting plate |
| 11 | additional return-and-retaining device |
| 12 | hard lubricant insert |
| 13 | recess for guide plate 8 |
| 14 | side shelf in movable plate 9 |
| 15 | hook in pressure wedge 6 |
| 16 | hook in stay wedge 7 |
| A-A | designation of the integrated frontal section per FIG. 1 |
| B-B | designation of the integrated frontal section per FIG. 5 |
| f1 | friction surface of pressure wedge 6 |
| f2, f3, and f5 | friction surfaces of stay wedges 7 |
| f4 | friction surface of supporting plate 10 |
| f6 and f9 | friction surfaces of movable plates 9 |
| f7 and f8 | friction surfaces of guide plates 8 |
| F10 | friction surface of housing 1 wall 3 |
| O-O | housing 1 main axis |
| P | external force |

The invention claimed is:

1. Friction shock absorber that comprises housing (1), whose walls (3) form orifice (2), and bottom (4) that is in contact with return-and-retaining device (5) contacting a friction assembly that consists of the following elements fitted out with friction surfaces (f1-f10): supporting plate (10), pressure wedge (6), stay wedges (7), and movable plates (9) fitted out with side shelves (14) resting against support plate (10), and guide plates (8) with return-and-retaining device (5) between them, wherein an additional return-and-retaining device (11) is available between pressure wedge (6) and supporting plate (10) of the friction assembly.

2. Shock absorber according to claim 1, wherein recesses (13) are available for return-and-retaining device (5) on guide plates (8).

3. Shock absorber according to claim 1, wherein hard lubricant inserts (12) are available on guide plates (8).

4. Shock absorber according to claim 1, wherein movable plates (9) are partially inverted-U-shaped, forming side shelves (14) that cover guide plates (8) and are located on supporting plate (10).

5. Shock absorber according to claim 1, wherein movable plates (9) are partially T-shaped forming side shelves (14) located on supporting plate (10).

6. Shock absorber according to claim 1, wherein hooks (15, 16) are available on pressure wedge (6) and stay wedges (7) located so as to enable a mutual contact during the back stroke of pressure wedge (6).

* * * * *